Figure 1:
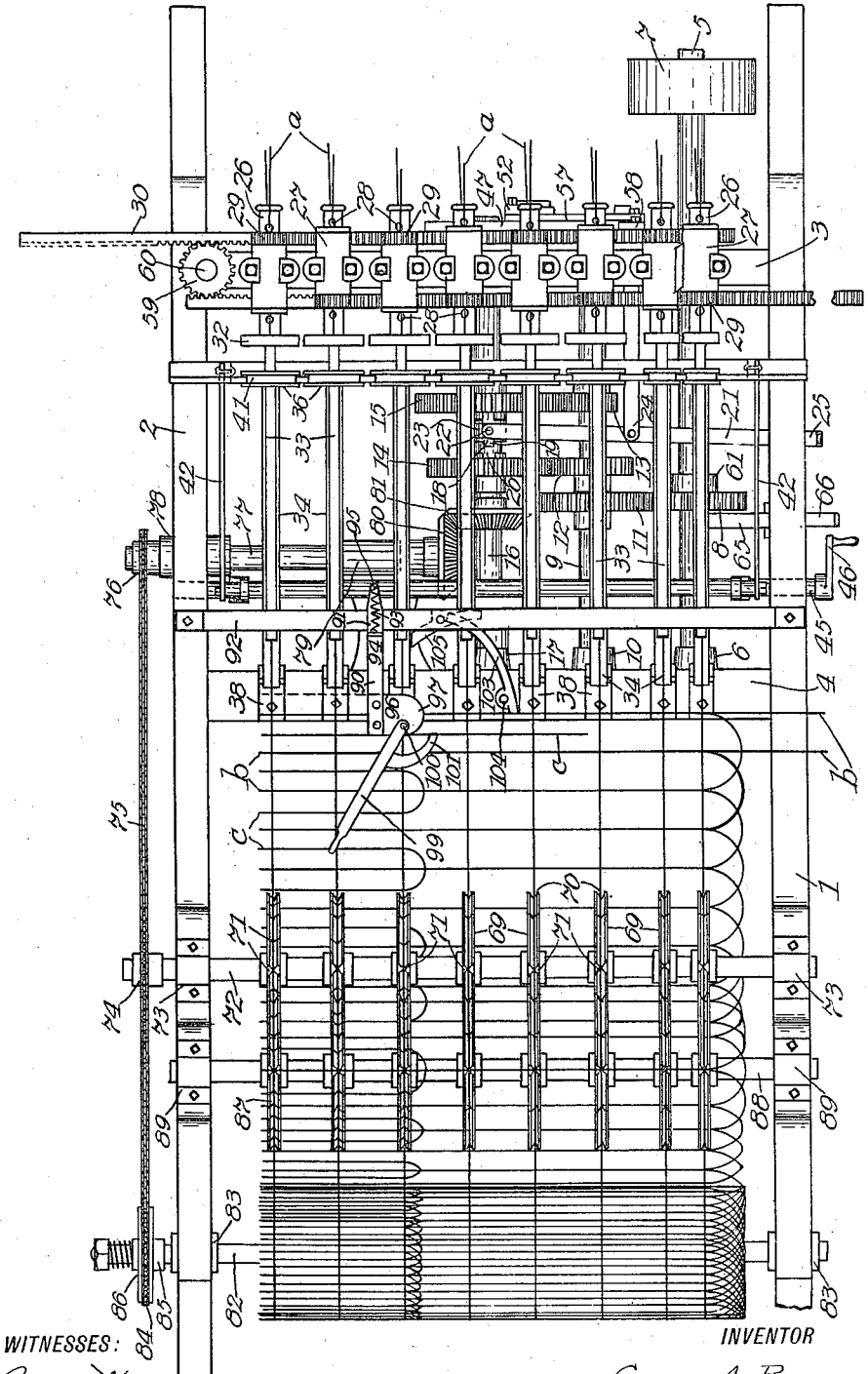

G. A. RAYMOND.
WIRE FENCE MACHINE.
APPLICATION FILED APR. 13, 1914.

1,149,596.

Patented Aug. 10, 1915.
5 SHEETS—SHEET 1.

WITNESSES:

INVENTOR
George A. Raymond
BY
ATTORNEY

G. A. RAYMOND.
WIRE FENCE MACHINE.
APPLICATION FILED APR. 13, 1914.
1,149,596.
Patented Aug. 10, 1915.
5 SHEETS—SHEET 3.
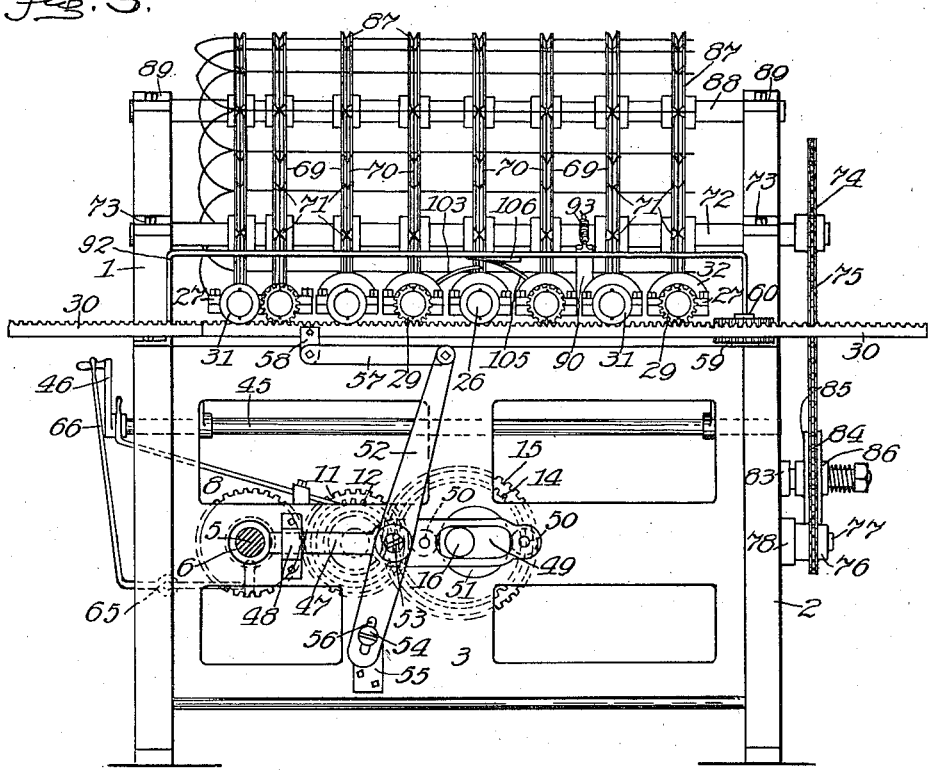
Fig. 3.
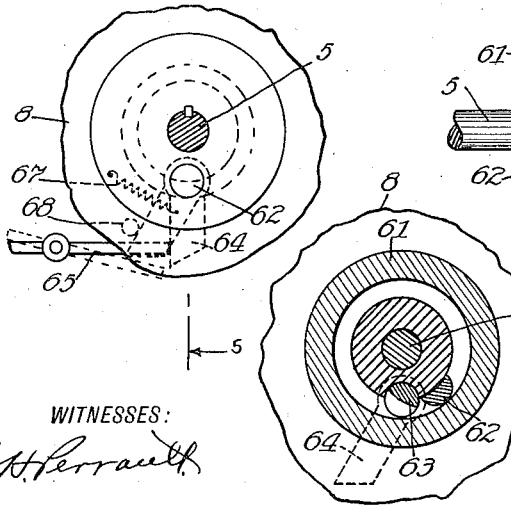
Fig. 4.
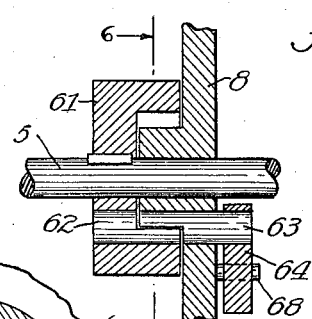
Fig. 5.
Fig. 6.
WITNESSES:
INVENTOR
George A. Raymond
BY
ATTORNEY

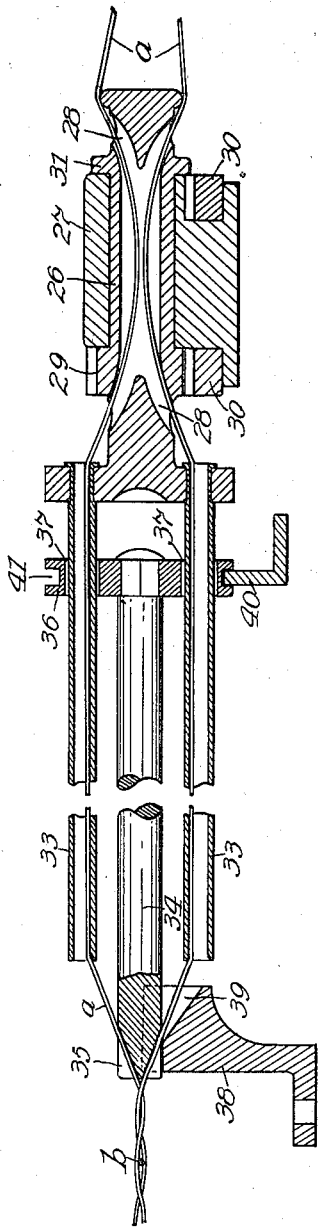
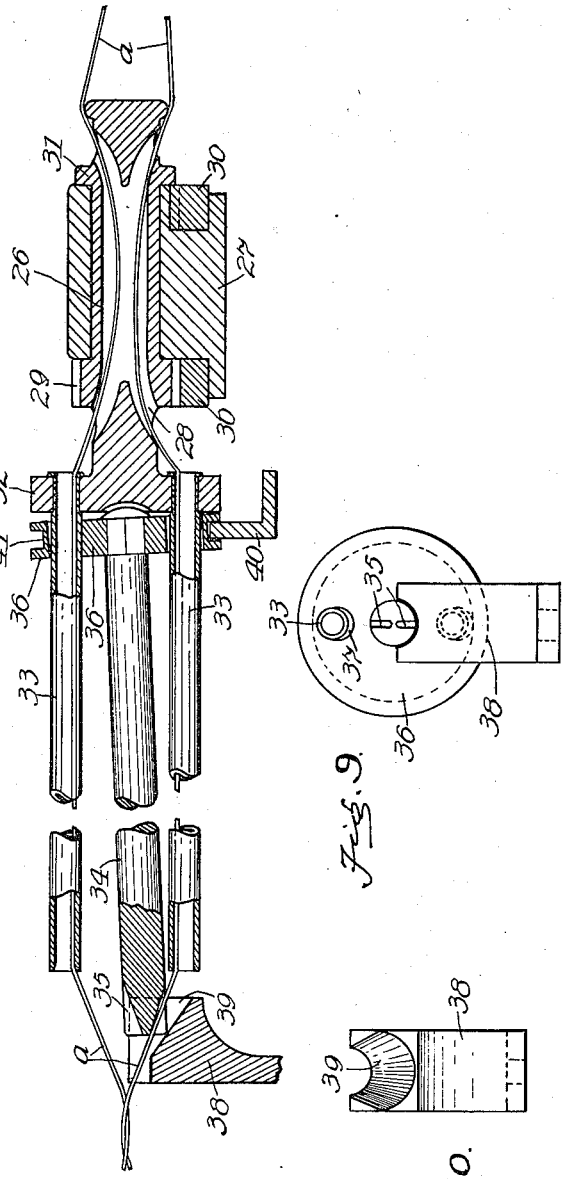
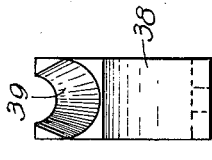

UNITED STATES PATENT OFFICE.

GEORGE A. RAYMOND, OF DETROIT, MICHIGAN, ASSIGNOR TO NATIONAL FENCE MACHINE COMPANY, OF DETROIT, MICHIGAN, A CORPORATION OF MICHIGAN.

WIRE-FENCE MACHINE.

1,149,596.	Specification of Letters Patent.	Patented Aug. 10, 1915.

Application filed April 13, 1914. Serial No. 831,360.

*To all whom it may concern:*

Be it known that I, GEORGE A. RAYMOND, a citizen of the United States, residing at Detroit, in the county of Wayne, State of Michigan, have invented certain new and useful Improvements in Wire-Fence Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a wire fence machine, and consists in the construction and arrangement of parts as hereinafter more fully set forth and pointed out particularly in the claims.

The primary object of the invention is to produce a comparatively simple and efficient machine for making ornamental wire fabric fencing, of the well known type in which the line wires or cables of the fabric comprise two wire strands, each twisted about the axis of the other and embracing transverse strands or picket wires spaced apart throughout the fabric.

The invention also contemplates means for feeding the fabric through the machine to accurately gage the spacing of the pickets, and to provide means for varying the spacing of the pickets to change the mesh of the fabric of the fence.

A further object of the invention is to provide a twisting head and forming device of such construction as will enable the formation and introduction of an arched intermediate picket in a portion of the fence fabric at one side thereof, in which the arch of the intermediate picket will be divided by alternate pickets of the fence fabric, and the side portions of the intermediate pickets will divide the spaces between adjacent pickets, being secured within the windings of the line wires so as to effect a closer mesh through that portion of the fence fabric. The mechanism for feeding and spacing the fence fabric, as well as for driving the twisting heads, is so arranged as to dwell at intervals during the operation to permit the insertion and formation of the pickets as they are embodied in the fabric. This mechanism together with the introduction and forming of the pickets in the machine is manually controlled.

Figure 2:
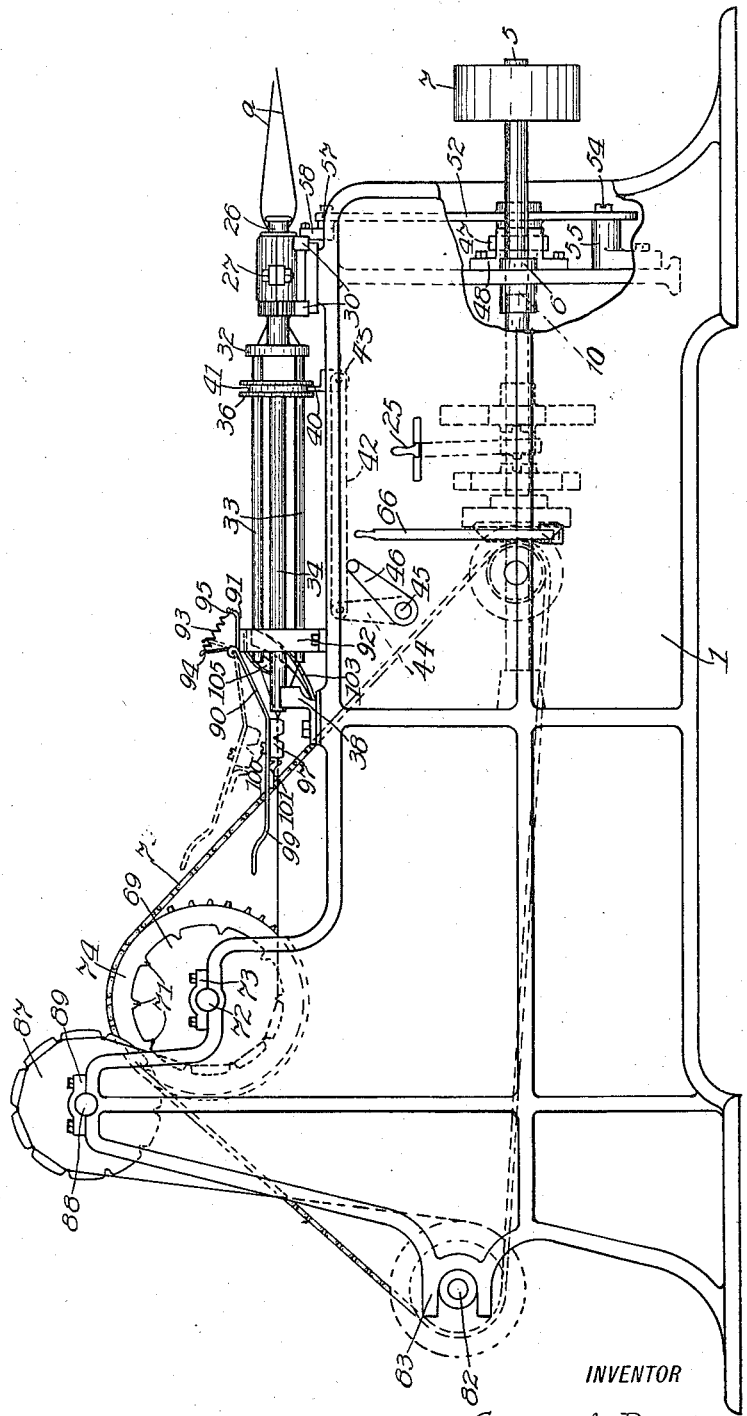
Figure 11:
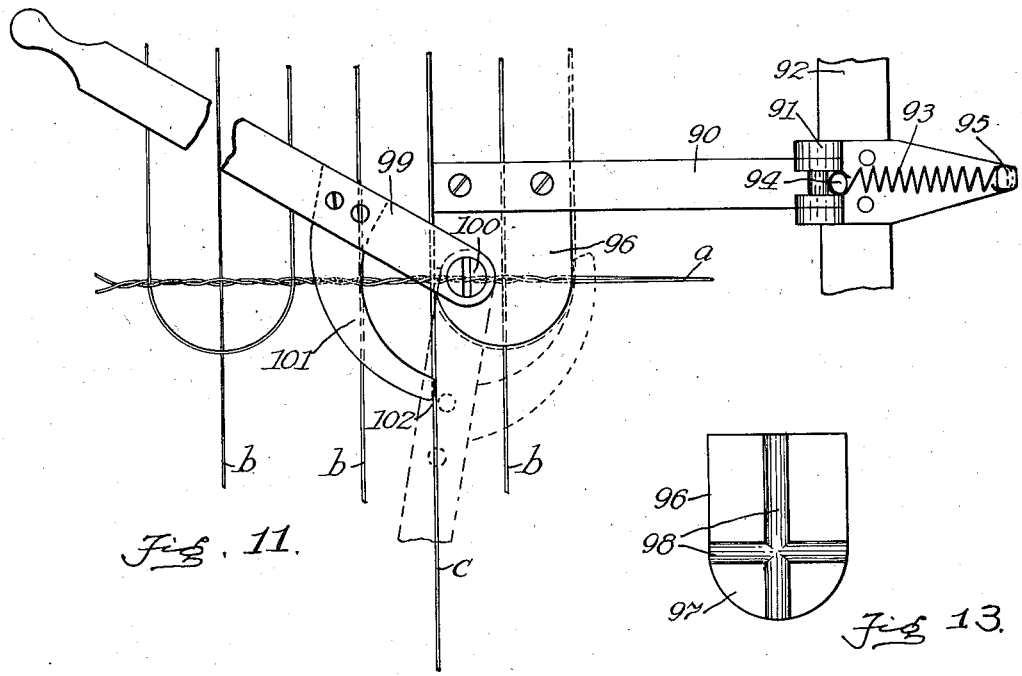
Figure 13:
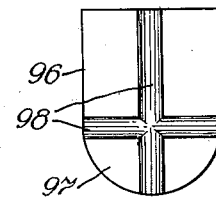
Figure 12:
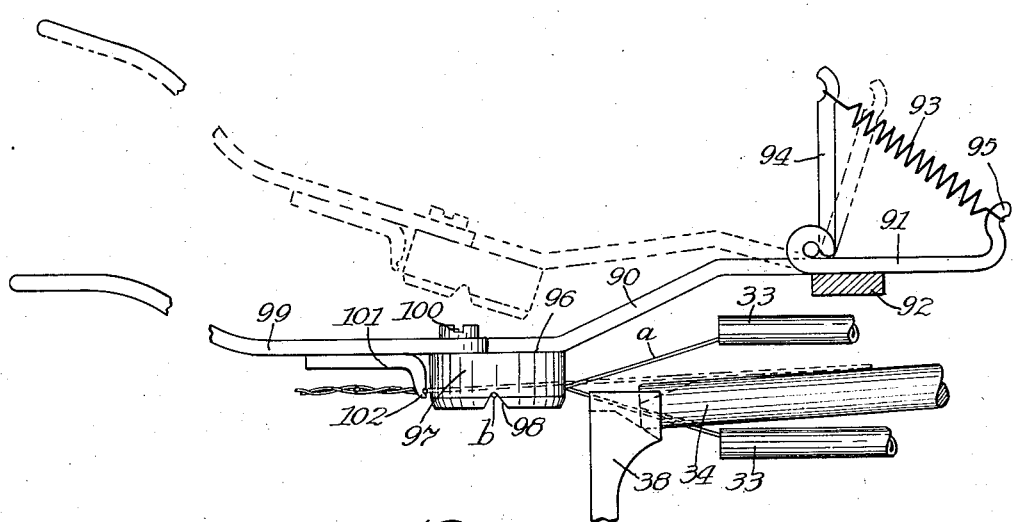

The above objects are attained by the employment of the mechanism illustrated in the accompanying drawings, in which:

Figure 1 is a plan view of the machine as it would appear in operation, showing the twisting heads threaded with the line wires and a portion of the fence fabric completed and wound upon the receiving drum. Fig. 2 is a side elevation of the machine, having a portion of the side frame at one end broken away and indicating by dotted lines the raised position of the picket-forming block when not in use. Fig. 3 is an end elevation of the machine. Fig. 4 is a detail view in elevation of the trip clutch mechanism for effecting a driving engagement to transmit the power from the driving shaft, and for automatically releasing it from its driving engagement to produce a dwell in the movement of the driving mechanism. Fig. 5 is a central vertical section through the engaging parts of the clutch, taken on line 5—5 of Fig. 4. Fig. 6 is a cross-section through the parts of the clutch, taken on line 6—6 of Fig. 5. Fig. 7 is an enlarged central longitudinal section through the twisting head, its journal-bearing support and the tooth-driving racks therein for rotating said head, also showing a steady rest for supporting the end of the twisting mandrel of the head and the shift-bar engaging a grooved disk carrying the twisting mandrel, by means of which said mandrel is shifted longitudinally of the head. Fig. 8 is a similar view to Fig. 7, but showing the twisting mandrel shifted longitudinally of the head with its forward or twisting end out of engagement with the line wires and resting in an inclined groove of the steady rest. Fig. 9 is an end elevation of the twister head and steady rest. Fig. 10 is a rear elevation of the steady rest. Fig. 11 is a plan view of the picket-forming mechanism, showing the pivotal lever with its arm engaged with a picket wire in position to form the picket into an arch, and indicating by dotted lines the completion of the movement of the lever and the formation of the picket. Fig. 12 is a side elevation of the picket-forming mechanism, showing also the forward end of a wire-twisting head with the twisting mandrel therein dropped down upon the inclined steady-rest to permit the passage of the end of the picket over said mandrel and into position between the line wires of the fence fabric, dotted lines indicating the position of the picket-forming device when raised by the tension of the spring to permit the movement of the fabric as it is stepped through the machine to receive the picket wires. Fig. 13 is an inverted plan view of the forming block around which the arch of the picket is formed.

In the drawings like reference characters refer to like parts throughout the several views.

The bed of the machine, shown in Figs. 1, 2 and 3 of the drawings, is composed of parallel side frames 1 and 2 connected by transverse or cross frames 3 and 4. The power for driving the several parts of the machine is distributed upon the frame as follows: The driving shaft 5 is mounted in bearings 6 in the cross frames 3 and 4, and carries at its outer end a belt pulley 7. Also mounted on this shaft is a trip-clutch driven gear 8 which is arranged to effect an intermittent or periodic drive and dwell with the shaft 5, as will be hereinafter more fully described. A countershaft 9 journaled in bearings 10 in the cross frames 3 and 4 is provided with a gear 11 which meshes with the gear 8 of the shaft 5, and is of the same diameter as said gear. Transmitting gears 12 and 13 of different diameters are also mounted on the shaft 9 and mesh with companion gears 14 and 15, respectively, loosely mounted on a main shaft 16 which is journaled in bearings 17 in the cross frames 6 and 7. To effect a driving engagement with the shaft 16 through either of the gears 14 or 15 thereon, a sliding clutch 18 is splined on the shaft 16 between said gears and is provided with shoulders 19 adapted to engage with shoulders 20 on the opposed hubs of said gears. Said clutch is provided with an actuating lever 21, which carries at its forward end a stud 22 in engagement with a circumferential groove 23 in the periphery of said clutch and is fulcrumed to swing on a pivotal support 24 by means of a handle 25 to shift the clutch into engagement with either of the gears 14 or 15.

The clutch, as shown in Fig. 1, in engagement with the gear 15 will effect a transmission of the power from the shaft 5 through the gears 8, 11 and 13 to the gear 15 of the shaft 16, in which arrangement the ratio of gearing is such as to impart to the shaft 16 a one-fourth revolution to each full revolution of the shaft 5, and when the clutch is shifted to engage the gear 14 of the shaft 16, said shaft will be caused to make one-half revolution to each full revolution of the shaft 5, and at the completion of each full revolution a dwell or rest in the movement of the driven parts will occur through an automatic release provided for the trip clutch gear 8. The mechanism for twisting the line wires or cables of the fabric, as well as the mechanism for feeding the fabric to gage the spacing of the pickets, is driven from the main shaft 16, and as the spacing of the pickets depends on the distance the fabric is moved at each revolution of the drive shaft, the gears 12 and 14 for imparting the greater movement to the shaft 16 are provided for use when it is desired to omit the intermediate pickets and make the fabric with the wider spaced full length pickets only.

As a means for twisting the cable wires of the fabric to confine the cross wires or pickets therebetween, and to effect this twisting in alternate directions between succeeding pickets, a series of twisting heads, as shown in Fig. 1, are mounted in parallel adjacent relation to each other upon the cross frame 3, being spaced apart to correspond with the spacing required for the cable wires of the fabric. As shown in Figs. 7, 8 and 9, each head consists of a sleeve 26 journaled to rotate in a suitable bearing 27 secured to the cross frame 3, and is cored out through its body to form a longitudinal opening communicating with peripheral apertures 28 upon opposite sides and at opposite ends of its journal bearing for the passage of the cable wires $a$ to be twisted. Secured to each sleeve alternately at opposite ends of their journal bearings 27 is a gear 29 which meshes at correspondingly alternate opposite sides of said journal bearings with one of a pair of rack bars 30 which are mounted to reciprocate in opposite directions in the journal bearing heads, by means of which said sleeves are rotated and reversed alternately in opposite directions. Collars 31 for engagement with one end of the journal bearing of the sleeve opposite the gear thereon are provided for holding the sleeve against end movement in its bearing.

Formed on the inner end of each sleeve is a flanged head 32, through which the inner ends of a pair of guide and spreading tubes 33 are secured so as to extend therefrom in parallel relation upon diametrically opposite sides. These tubes act as spreaders for the cable wires $a$, which are threaded through the apertures 28 of the sleeve, and passing through the tubes 33 are brought together at the forward ends of said tubes to be twisted. At this point the wires are engaged by the forward end of a horizontally movable twisting and ramming mandrel 34, in which inclined radial slots 35 cut in the end of said mandrel receive the wires and form engaging shoulders for twisting the strands together. The rear end of this mandrel is secured rigidly and centrally in a disk 36, having elongated apertures 37 which freely receive the guide tubes 33 on which said disk may slide and tilt, and by means of which said disk and mandrel are caused to rotate with the sleeve 26.

The mandrel when rotating to twist the wires of the cable is supported at its forward end in axial alinement with the sleeve upon a steady rest 38 secured to the cross frame 4. Said rest has in its rear face an inclined concavity 39 upon which the end of the mandrel drops downwardly when withdrawn from the cable wires to provide space between the top of said mandrel and the upper guide tube for permitting the passage of a picket wire therethrough into position between the cable wires. (See Fig. 12).

The mandrel of each twister head is shifted longitudinally and simultaneously through the series by means of an angle bar 40 which is slidably supported at its ends on the side frames 1 and 2, and extending across beneath the twister heads engages at its upper edge with circumferential grooves 41 in the periphery of the disks 36. This bar is shifted laterally of its length to move the disks and mandrels longitudinally of the twister heads by means of connecting rods 42, each of which is pivotally attached at one end to an ear 43 on said angle bar and is pivotally connected at its opposite end to a crank arm 44 carried by a rock-shaft 45 journaled at its ends in the side frames 1 and 2, and by means of a crank handle 46 said shaft may be manually rocked to shift the bar and mandrels (see Figs. 1 and 2).

The mechanism for reciprocating the rack-bars to rotate the twister heads and twist the strands of the cables in opposite directions alternately between succeeding pickets, is driven from the end of the main shaft 16 (see Fig. 3), and consists of a reciprocal cam bar 47 slidably supported at one end in a bearing 48 on the cross frame 3 and provided at its opposite end with an elongated aperture 49 through which the end of the shaft 16 passes and forms a support on which said bar may reciprocate. The inner face of the cam bar 47 is provided with a pair of studs or rollers 50 which engage upon opposite sides with a surface cam 51 secured rigidly on the shaft 16, through the rotation of which a reciprocating movement is imparted to said cam bar. The movement of the cam bar is transmitted to one of the rack-bars 30 through a lever 52 which is pivoted to swing on a stud 53 in said bar, and is adjustably fulcrumed at its lower end on a stud 54 that is secured to a movable support 55 on the frame 3 and passes through an elongated aperture 56 in the end of said lever. The upper end of this lever is pivotally connected to one end of a connecting rod 57 which rod is pivotally connected at its other end to a fitting 58 secured to the outermost of the pair of rack bars 30, to which a reciprocating movement is imparted through the swinging movement of said lever. The movement of the outermost rack is transmitted in a reverse direction to the inner rack by a gear 59 journaled on a stud 60 in the frame 2 and interposed between the racks 30 in mesh with teeth formed in the opposed faces of said racks. (See Fig. 1).

As the number of rotations of the twister heads depends upon the length of travel of the racks, and as the throw of the lever 52 determines this, provision is made for adjusting the fulcrum stub at the lower end of the lever to regulate and determine the travel of said lever so that the twister heads will make the required number of revolutions at each periodic revolution of the drive shaft, and also stand during the periods of rest with the guide or spreader tubes in vertical alinement to present an open space for the passage of the picket wires between the cable wires when the mandrels are withdrawn, as shown in Figs. 8 and 12.

The trip clutch shown in Figs. 4, 5 and 6 for effecting a driving engagement and automatic release with the shaft 5 through the gear 8 is constructed and operates as follows: A hollow collar 61 is keyed rigidly to the shaft 5 and provided through its body with a hardened stud 62, the inner end of which is cut away at its upper half, leaving the lower half projecting into the hollow of the collar. The gear 8 is provided with a hub which projects into the hollow of the collar 61, and extending through this hub in line with the stud 62 is a rotatable stud 63, the inner end of which is cut away in a reverse manner to the stud 62 so that the projecting ends of these studs over-lap and coincide with each other, in which position the parts are free to pass each other as the collar revolves with the shaft and the gear dwells loosely on the shaft. It will be seen by referring to Fig. 6 that when the stud 63 is rotated its inner halved end will be projected into the path of travel of the halved end of the stud 62, and that a driving engagement between the two members will result. To provide for rotating the stud 63 to make this driving engagement in a manner to effect an automatic release, a trigger 64 is secured at one end to the outer end of the stud 63 and is adapted to be engaged at its lower end by a release stop which is shown in Figs. 3 and 4, in the form of a lever 65 pivoted to a suitable support on the frame and provided at its upper end with a handle 66, by means of which the lower end may be swung out of engagement with the trigger. The trigger normally stands in engagement with the releasing stop lever, in which position the stud 62 registers with and passes the stud 63. When the trigger is released by the disengagement of the lever with the end thereof, it is swung to rotate the stud by the tension of a coiled spring 67 attached at one end to said trigger and at its opposite end to the face of the gear 8, a stop 68 being provided in the face of said gear for engagement with the trigger to limit its throw when released. By this means the gear 8 is caused to dwell during the time the trigger is engaged with the stop lever, and when released effects a driving engagement between the gear 8 and the shaft 5, which engagement is again released at each complete revolution of the shaft by contact of the trigger with the stop lever, which normally lies in the path traveled by the end of said trigger. The cable wires $a$ are fed in pairs from suitable reels, not shown, and are threaded through the sleeves and guide tubes of the twisting heads, at the ends of which they are brought together to receive the picket wires $b$. These picket wires are cut to length and fed transversely into the machine by hand between the cable wires at the forward ends of the twisting mandrels and are engaged by the ends of said mandrel and rammed firmly into contact with the cable wire at their points of juncture when said mandrels are shifted forward to engage said wires preparatory to twisting them together.

The fabric when formed is drawn through the machine step by step, as required for the spacing of the pickets, by means of a series of feed and spacing disks 69, which are provided with circumferential groove 70 for receiving the cable wires and a series of peripheral notches 71 spaced to register with and receive the picket wires of the fabric. (See Figs. 1 and 2.) These disks are mounted upon a shaft 72 journaled in bearings 73 on the side frames 1 and 2, and are driven through a sprocket wheel 74 secured to the outer end of said shaft and connected by a sprocket chain 75 with a sprocket wheel 76 mounted on the end of a shaft 77 which is journaled in bearings 78 and 79 respectively on the frames 2 and 4. Said shaft 77 carries a miter gear 80 on its inner end which meshes with a miter gear 81 on the main shaft 16, by means of which the power of said shaft is transmitted to said feed and spacing disks. The sprocket chain 75 is also employed for driving a receiving drum mounted on the shaft 82 journaled in bearings 83 in the side frames 1 and 2, and carrying at its outer end a sprocket wheel 84 which is embraced between a fixed flange 85 secured to said shaft upon one side, and a spring tensioned flange 86 bearing upon the opposite side of said sprocket around which said chain passes and which serves as a friction drive for said drum to permit of slippage as the diameter of the drum increases in receiving the fence fabric. An additional set of disks 87, adapted to receive and register with the cables and picket wires of the fence fabric, is mounted upon a shaft 88 which is supported in bearings 89 upon the side frames 1 and 2 at a point above the feeding and spacing disks 69, around which the fence fabric passes and from which it feeds onto the receiving drum. (See Figs. 1 and 2.)

In addition to the twisting of the cable wires $a$ and the securing therein of the main picket wires $b$ of the fabric, the machine is designed to form intermediate pickets $c$ into arches by bending said pickets at their centers and introducing them between windings in the cable wires in the spaces between the main pickets through a portion of the width of the fabric. The mechanism for bending these pickets is illustrated more clearly in Figs. 11 and 12, and consists of a supporting arm 90 hinged at one end to swing on a support 91 attached to a yoke 92 which is supported at its ends upon the frames 1 and 2 and extends across and above the forward ends of the twister heads. Said arm is normally held in a raised position above the fabric by means of a coiled spring 93 attached at one end to an upwardly extending portion 94 of the supporting arm 90, and attached at its other end to an extension 95 on the support 91. The free end of said supporting arm is provided with a forming block 96 having a semi-circular end 97 around which the intermediate picket wire $c$ is bent to form an arch. The bottom of this forming block is provided with intersecting longitudinal and transverse grooves 98 adapted to receive respectively a picket wire and one of the cable wires of the fabric over which said block is positioned at a point in advance of the twister heads and is adapted to lie astride the last inserted main picket wire $b$ of the fabric. The width of the block is equal to the distance between the main pickets $b$ and lies with its outermost edge in contact with the last inserted intermediate picket $c$, which has been secured through a portion of its length only between the cable wires. The remaining unsecured portion of said picket is bent around the semi-circular end of said block by means of a swinging hand lever 99 pivoted to a stud 100 in the upper face of said block, and is provided with a downwardly extending curved arm 101 attached at one end to said lever and having at its opposite end a notch 102 for engagement with the picket wire $c$ to carry said wire around the forming block. When the hand lever 99 is swung to bend the picket, the free end of said picket will be carried in the arc of a circle toward the ends of the twister heads that are located in advance of the forming block, and in order to permit the end of this picket to pass over said heads as it is being formed around the block, an inclined guide 103 (see Figs. 1 and 3) is secured at 104 to the cross frame 4 in such position between the heads in the path of travel of the end of the picket as to carry said picket over said heads. To further the guide the picket in a downward course so as to permit it to pass through the remaining heads and between the wires by which it is to be bound, an inclined guide 105 is secured to the under side of the yoke 92 at 106 (see Fig. 3), in such position as to guide the traveling end of the picket downwardly through the space between the twisting mandrel and the upper guide tube of the adjacent twisting heads of the cable wires between which said picket is to be secured, as indicated by dotted lines in Fig. 12, whereby said picket is placed between the cable wires in position to be engaged and rammed into place therebetween by the ends of the twisting mandrels as said mandrels are shifted forward by the movement of the shifting bar through the rocking of the shaft 45 by its crank handle 46. During this operation of forming and inserting the picket, the mechanism for driving the other parts of the machine is at rest. As soon as this operation is completed the hand lever 99 is returned to its former position and when released the tension of the spring 93 acting on the arm 90 will swing said arm and its forming block upwardly out of engagement with the wires of the fabric, as indicated by dotted position in Figs. 2 and 12. The mechanism for twisting the wires and drawing the fabric through the machine may then be started by tripping the lever 65 out of engagement with the trigger 64 of the clutch of the gear 8, when said gear will transmit movement to the twister heads to rotate said heads alternately in opposite directions through the rack-bars and their driving connection as before described, and the feeding and spacing disks for moving the fabric forward will be rotated an angular distance equal to the distance between the adjacent portions of the intermediate pickets, and at the completion of a full revolution of the drive shaft the clutch will be automatically disengaged through the tripping of its trigger and the parts will again dwell to permit the introduction of either a full length picket or an intermediate picket, as may be required.

The ends of the full length pickets may be bent and engaged with each alternately succeeding picket and confined between the cable wires, if desired, in a manner similar to that employed for forming the intermediate pickets by placing a similar forming block and lever in line with the uppermost edge of the fabric for this purpose, or the ends of the main picket wires may be left straight, as may be desired.

The principal features of this invention embodied in the general plan of the machine reside in the construction and arrangement of parts, including especially the long open twisting heads, together with the picket bending means to permit the forming and introduction of the intermediate pickets into a portion of the fabric simultaneously with the building up of the fabric in the full-length pickets, in which the mesh of the fabric may be closer woven through one portion than through the remainder of its width, and also in the means for feeding the fabric through the machine to uniformly determine the gage and spacing of the picket wires.

Having thus fully set forth my invention, what I claim as new, and desire to secure by Letters Patent, is:

1. In a wire fence machine, the combination of a supporting frame, a series of heads for twisting the cable wires of a fence fabric mounted thereon, each head comprising a revoluble sleeve having guide tubes for the passage of the cable wires therethrough and a movable mandrel carried at one end upon said guide tubes and adapted to engage and twist the cable wires at its opposite end, means for forming and passing a picket wire between said guide tubes for engagement with the end of said mandrel to be rammed thereby between said cable wires, means for shifting said mandrels longitudinally of said heads to engage said picket and said cable wires, and means for rotating said heads and mandrels to twist said cable wires about said picket wire.

2. In a wire fence machine, the combination of a supporting frame, a series of heads for twisting the cable wires of a fence fabric mounted thereon, each head comprising a hollow revoluble sleeve having guide tubes for the passage of the cable wires therethrough and a longitudinally movable wire twisting mandrel carried at one end upon said guide tubes and adapted to rest on an inclined support at its forward end, a picket wire forming device removably supported upon said fabric for forming a picket wire into an arch and passing one side thereof over said mandrel to be engaged by the end of said mandrel and forced thereby between the wires of the cable, means for shifting said mandrels longitudinally to engage said picket and cable wires, and means for rotating said heads and mandrels to twist the cable wires about said picket.

3. In a fence machine, the combination of a frame, a series of twisting heads for the cable wires of the fence fabric mounted on said frame, means pivotally supported upon said frame and adapted to swing into engagement with the fabric for forming the picket wire into an arch and placing one side thereof between the cable wires, means slidably carried by each twister head to rotate therewith for engaging said picket wire and said cable wires to force said picket wire into position between said cable wires and twist said wires thereon, means for rotating said twister heads, and means for moving said cable wires in steps through said twister heads.

4. In a fence machine, the combination of a frame, a shaft journaled to rotate on said frame and having a series of disks provided with peripheral grooves and notches adapted to receive the cable wires and picket wires respectively of a fence fabric, means for forming a picket wire into an arch supported on said frame and adapted to be moved into engagement with the fabric and to normally stand out of engagement with said fabric, a series of sleeves each having longitudinal passages and guide tubes for the cable wires, means slidable on said tubes for engagement with the picket wire and for twisting said cable wires together, means for rotating said heads in opposite directions to twist the cable wires between succeeding picket wires, and means for turning said shaft and disks to move said cable wires the distance between pickets.

5. In a wire fence machine, the combination of a supporting frame, a drive shaft journaled in bearings thereon, a series of wire twisting heads mounted to rotate in bearings on said frame to twist the cable wires of a fence fabric, a gear on each twister head at alternate opposite ends of said bearings, a reciprocal rack-bar at each end of said bearings for rotating said gears, means connecting said bars together to transmit the movement of one bar in a reverse direction to the other, and means connecting with said drive shaft and with one of said bars for imparting a reciprocating movement thereto and for adjustably regulating the throw of said bar.

6. In a wire fence machine, the combination of a supporting frame, a series of heads for twisting the cable wires of the fence fabric mounted thereon, each head comprising a revoluble sleeve having guide tubes for the passage of the cable wires therethrough and between which a picket wire may pass, a wire twisting mandrel movably carried at one end between said guide tubes and adapted to engage at its opposite end with the wires of the cable, means supported on said frame for forming a picket wire into an arch, means on said frame for guiding one end of said picket wire over certain of said heads and for passing said wire between the guide tubes of the other of said heads to be engaged between the wires of the cable, means for shifting said mandrels longitudinally to engage said picket wire and said cable wires, and means for rotating said heads and mandrels to twist the cable wires about said picket wire.

7. In a wire fence machine, the combination of a supporting frame, a series of heads for twisting the cable wires of a fence fabric mounted thereon, each head comprising a hollow revoluble sleeve having guide tubes for the passage of the cable wires therethrough, a disk slidable on said guide tubes and having a peripheral groove for engagement with a shifting bar, a wire twisting mandrel carried at one end by said disk and provided at its other end with radial slots to receive the cable wires, a steady rest for the end of said mandrel mounted on said frame, means for forming and inserting a picket wire between said guide tubes, means for shifting said disks to engage said mandrels with said picket and said cable wires, and means for rotating said heads and mandrels to twist said cable wires about said picket wire.

8. In a wire fence machine, the combination of a frame, a series of twisting heads for the cable wires of a fence fabric mounted on said frame, each head having a sleeve journaled in a bearing on said frame, a gear on each sleeve at alternate ends of each succeeding bearing, a rack-bar at each end of said bearings in mesh with said gears, a gear on said frame in mesh with each of said rack-bars, a drive shaft and a driven shaft on said frame, a cam on said driven shaft, a lever adjustably fulcrumed on said frame and connected with said cam and with one of said rack-bars, means for effecting a driving connection between said drive and driven shafts, and means on said frame for releasing said driving connection at each revolution of said driven shaft.

In testimony whereof, I sign this specification in the presence of two witnesses.

GEORGE A. RAYMOND.

Witnesses:
B. F. WHEELER,
M. E. BROESAMLE.